Patented Oct. 12, 1937

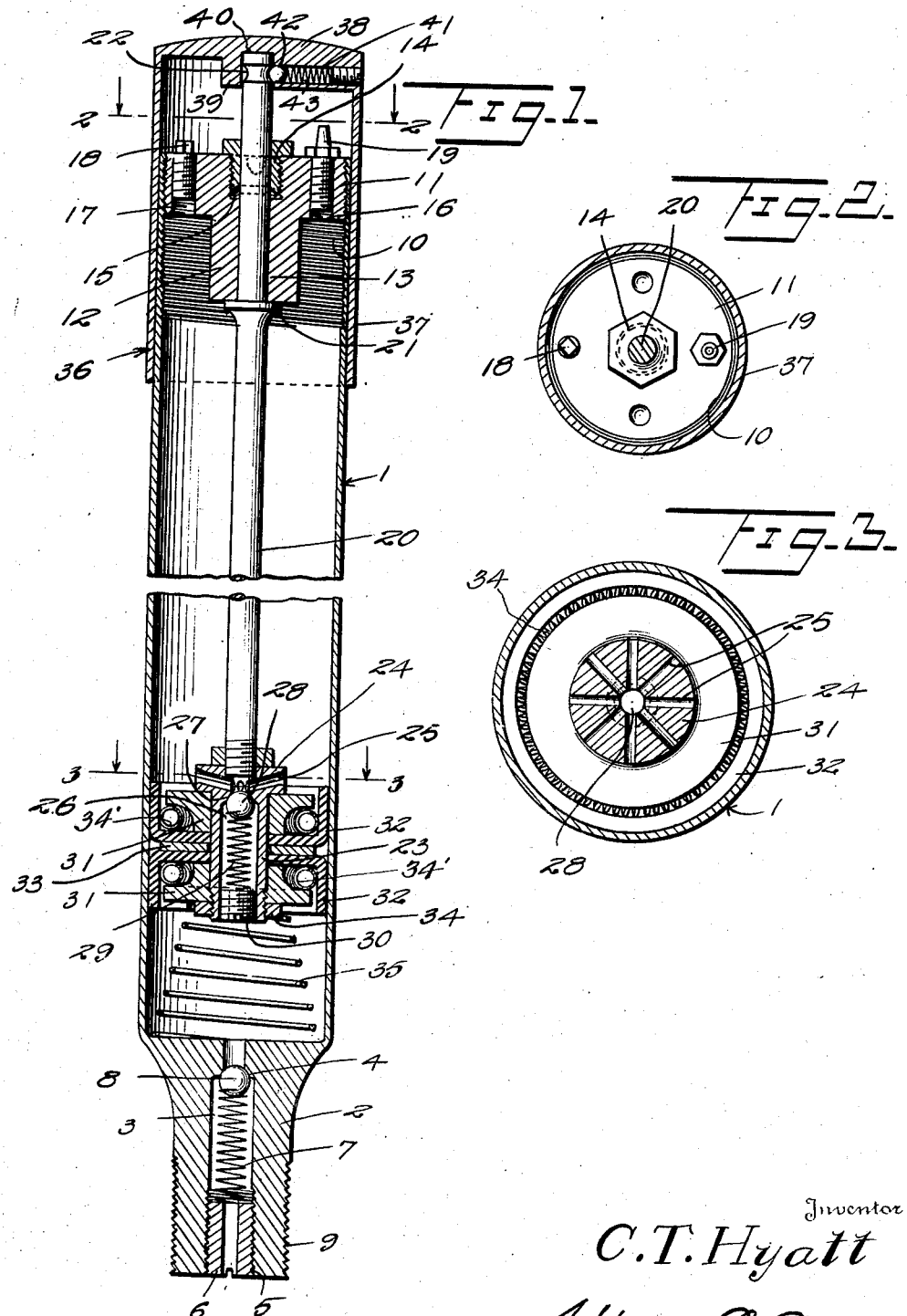

2,095,362

UNITED STATES PATENT OFFICE 2,095,362

DIE STOCK HANDLE

Charley T. Hyatt, Tulsa, Okla.

Application April 27, 1937, Serial No. 139,280

5 Claims. (Cl. 10—126)

This invention relates to an improved lubricating mechanism, and pertains particularly to mechanism for lubricating die stocks used in cutting threads.

In the use of die stocks for cutting threads, it is necessary for the operator to apply oil to the cutters, during the cutting operation, and the present invention has for its primary object to provide an improved die stock handle which is so designed that it may be easily filled with a suitable lubricant and the lubricant may be conveniently ejected therefrom into the die as may be found necessary, while the cutter is working.

Another object of the invention is to provide a die stock handle having a novel means associated therewith whereby a prescribed quantity of lubricant may be ejected onto the die cutter by the application of pressure to a movable end portion of the handle.

A still further object of the invention is to provide an improved lubricant supplying handle for die stocks wherein a novel construction is employed for ejecting lubricant from within the handle onto the die stock without making any great departure in construction from handles of the type at present in use.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a longitudinal sectional view thru the handle embodying the present invention.

Fig. 2 is a section taken on the line 2—2 of Fig. 1.

Fig. 3 is a section taken on the line 3—3 of Fig. 1.

Referring now more particularly to the drawing, the numeral 1 generally designates the handle body which, as shown, is hollow and at one end is drawn off into the reduced longitudinally extending stud portion 2 through which there is formed the longitudinal passage 3, one end of which is reduced to form a ball valve seat 4. The outer end of the passage is screw-threaded as indicated at 5, to receive a tubular nut 6, and this nut retains in position within the passage 3 the spring 7 which in turn bears against and holds on the seat 4 the valve ball 8. The reduced stud 2 is exteriorly screw-threaded also, as indicated at 9, to facilitate coupling the handle body with the die stock.

At its opposite or outer end the handle body is initially open and is interiorly threaded, as indicated at 10. Adapted for threadable engagement in the end of the handle body is the head 11 from the inner side of which a stud 12 extends and through the head and stud is a passage 13 for the purpose hereinafter described. At the outer end of the passage the same is of enlarged diameter to threadably receive the packing retaining nut 14, the packing 15 being held in place thereby so as to form a leak-tight joint around the hereinafter described rod which passes longitudinally thru the body. The head 11 is provided with two filling openings 16 and 17. One of these openings is closed by the threaded plug 18 while the other is provided with a fitting of the type designed to have a grease gun coupled therewith so that the grease or oil can be fed in thru this fitting to the interior of the body 1. Such a fitting, known as a "Zirk", is indicated by the numeral 19.

Extending longitudinally through the major portion of the hollow body 1 is a rod 20, the outer end of which passes through the passage 13 in the head 11 and has its movement limited outwardly by the integral surrounding flange 21, which abuts the inner end of the extension or stud 12 of the head. At its outer end beyond the head 11 the rod is provided with the encircling groove 22, for the purpose hereinafter described. The inner end of the rod is threadably secured in the end of a tubular nipple 23. This nipple has one end enlarged to form the head 24 in the center of which the rod 20 is secured, and a plurality of passages are formed in the side or periphery of the head, as indicated at 25, and lead into the center passageway or bore 26. Suitable constriction of the passageway 26 inwardly from the inner ends of the passages 25, forms a seat 27 for a ball 28, and this ball is held on the seat by the spring 29 which in turn is maintained in place by the inserted tubular plug 30.

The nipple carries the two metallic cup rings 31, the two suction cups 32, and a dividing disc 33. These cup rings, the cups 32, and the disc, all go to form a double-acting piston in which the outer cup operates when the piston is drawn outwardly and the inner cup, which is oppositely directed, operates to force fluid towards the passage 3 when the piston is forced inwardly. The lower end of the nipple 23 receives the nut 34 which forces the rings 31, the cups and the disc 33 outwardly against the head 24 of the nipple. In order that the sides of the piston cups may bear firmly against the wall of the body 1 in which the piston works, suitable springs 34' in the form of annuli are placed about the reduced portions of the cup rings 31 in the manner illustrated.

Interposed between the piston and the inner end of the body is a spring 35 which normally tends to force the piston outwardly as far as the flange 21 upon the rod 20 will permit it to go.

The outer end of the body 1 is slidably disposed in the relatively long cap 36, the side of which is indicated by the numeral 37 while the end wall is indicated at 38. This end wall is provided with a thickened inner portion 39 which has a recess 40 adapted to receive the end of the rod 20 in which the surrounding groove 22 is formed and extending inwardly from the outer side of the cap and through the thickened portion 39 is a passage 41 in the inner end of which is held a ball 42 by the spring 43. As will be readily apparent, this ball and spring form a releasable coupling between the cap and the outer end of the rod 20 and when the rod and cap are coupled together so that the outer end of the body 1 is disposed within the cap, the latter may be forced inwardly a short distance so as to effect the movement of the piston 2 toward the outlet valve 8 and against the resistance of the spring 35.

In the use of the present die stock handle, the reduced stud 20 is threaded into the stock after the body 1 has been filled with the desired lubricant. When it is desired to force some of the lubricant out past the valve 8, the cap 36 is forced inwardly, which will effect the movement of the piston against the tension of the spring 35 and then by releasing the cap so as to allow the spring to force the piston out and again pressing the cap in, more of the lubricant will be made to pass from the side of the piston nearest the head 11 to the opposite side through the passageways 25 and past the ball valve 28. It will thus be seen that subsequent inward movement of the piston will force the trapped lubricant past the ball valve 8 and onto the work upon which the stock is mounted. When the piston is forced back by the spring 35 another charge of lubricant will pass through the valve controlled passage 27 and be in place for ejection upon a subsequent inward movement of the handle cap 36.

I claim:

1. An improved die stock holder, comprising an elongated hollow body having one end reduced to form a stud, screw threads formed exteriorly of said stud to facilitate attachment of the handle to a die stock, said stud having a longitudinal passage therethrough, an outwardly opening ball check valve in said passage, a head removably secured within the other end of the body, means forming a part of said head facilitating the introduction of lubricant into the body through the head, an elongated cap slidably disposed over the head end of the body, a rod extending longitudinally through the body and having one end extended through said head, means securing the said one end of the rod to the cap, a piston secured to the other end of the rod and slidable in the body relative to said valved passage, resilient means interposed between the piston and the adjacent end of the body to normally urge the piston away from said passage, said piston having a lubricant passage formed therethrough, and a check valve controlling said last passage and permitting lubricant to flow past the piston only in the direction of the first mentioned passage when the piston is moving away from the same.

2. An improved die stock handle comprising an elongated hollow body having one end closed and reduced to form an attaching stud, said stud having a longitudinal passage therethrough, an outwardly opening ball check valve in said passage, a cap slidably disposed over the other end of the body, a piston rod secured at one end to said cap and extending longitudinally of and within the body, a longitudinally bored nipple secured at one end to the end of the rod remote from the cap, said nipple having lateral openings leading into the bore thereof at the end of the nipple adjacent the cap, a ball check valve normally closing said passage and adapted to open in the direction of the stud end of the body, a pair of washer members encircling said nipple and engaging the wall of the body, a spring member interposed between said washer members and the stud end of the body and normally forcing the washer members away from the first mentioned valve controlled passage, and means limiting the movement of said rod away from said first mentioned passage.

3. An improved die stock handle, comprising an elongated hollow body having one end reduced to form a stud facilitating the attachment of the handle to a die stock, said stud having a longitudinal outlet passage therethrough, a spring-pressed ball valve controlling said outlet passage, a piston head within the body and having a passageway formed therethrough, a spring-pressed ball valve in said passageway adapted to open the passage in the direction of the adjacent outlet passage, a spring member interposed between the piston head and the adjacent stud end of the body to normally urge the piston away from said adjacent end, means closing the other end of the body, an elongated cap member slidably mounted upon the said other end of the body, a rod connected at one end with said piston head and passing through said closing means and having its other end detachably coupled with said cap, and means facilitating the introduction of a lubricant into the body through said closing means when said cap has been detached from the rod and removed from the body.

4. A die stock handle comprising an elongated hollow body formed at one end to facilitate its application to a die stock, the said end having an outlet passage therethrough, a self-closing outlet valve in said passage, the hollow body being designed to contain a lubricant, a hollow cap slidably mounted upon and encasing a portion of the other end of the body, means movable within the body for forcing lubricant past said valve through said passage, means for passing lubricant from one side of said means to the side nearest the outlet passage, a releasable coupling between said cap and said movable means, resilient means constantly urging said movable means and cap away from the valve, and means in the said other end of the handle which is covered by the cap and which facilitates the introduction of lubricant into the handle.

5. A die stock handle, comprising an elongated hollow body adapted to receive a lubricant, a valved outlet at one end of the handle, said outlet end being formed for connection with the die stock, a tubular cap having the other end of the body slidably extended thereinto, said cap having a head with a socket in its inner side, a closure for the end of the body received by the cap and having a passage therethrough, a rod extending longitudinally within the body and having one end extending through said passage and inserted into said cap head socket, means releasably securing said rod end in the socket, means for introducing lubricant into the body through the end carrying said closure, means carried on the other end of said rod within the body facilitating expulsion of lubricant through the valved outlet when the rod is shifted toward the outlet, and means permitting lubricant to pass said last means when the rod is oppositely shifted.

CHARLEY T. HYATT.